United States Patent [19]

Prinz et al.

[11] Patent Number: 4,784,547
[45] Date of Patent: Nov. 15, 1988

[54] CARGO RESTRAINING DEVICE FOR A VEHICLE

[75] Inventors: Clarence R. Prinz, Roanoke, Va.; Troy B. Malone, Ooltewah, Tenn.

[73] Assignee: Southern Railway Company, Atlanta, Ga.

[21] Appl. No.: 37,324

[22] Filed: Apr. 13, 1987

[51] Int. Cl.[4] .............................................. B60P 1/00
[52] U.S. Cl. ...................................... 410/52; 410/153; 410/156
[58] Field of Search .................. 410/52, 94, 121, 153, 410/90, 156; 180/271, 281, 290; 280/432; 105/380, 382, 386, 387, 389, 390, 391; 296/43

[56] References Cited

U.S. PATENT DOCUMENTS

| | | |
|---|---|---|
| 1,056,290 | 3/1913 | Murphy ................................ 105/386 |
| 1,231,843 | 7/1917 | Brady ................................... 105/389 |
| 1,498,763 | 6/1924 | Sunde ................................... 105/387 |

Primary Examiner—Robert B. Reeves
Assistant Examiner—Joseph D. Pape
Attorney, Agent, or Firm—Watson, Cole, Grindle & Watson

[57] ABSTRACT

In a vehicle adapted to carry cargo, the vehicle includes a cargo supporting surface having at least one opening and a cargo restraining device comprising a standard at least partially within the opening and capable of projecting from the opening above the cargo carrying surface. The device further includes a rotatable actuation shaft extending beneath the cargo supporting surface, and a control arm extending from the shaft and having a camming surface engaging the standard. Upon rotation of the actuation rod, the standard is caused to be displaced vertically within the opening.

14 Claims, 2 Drawing Sheets

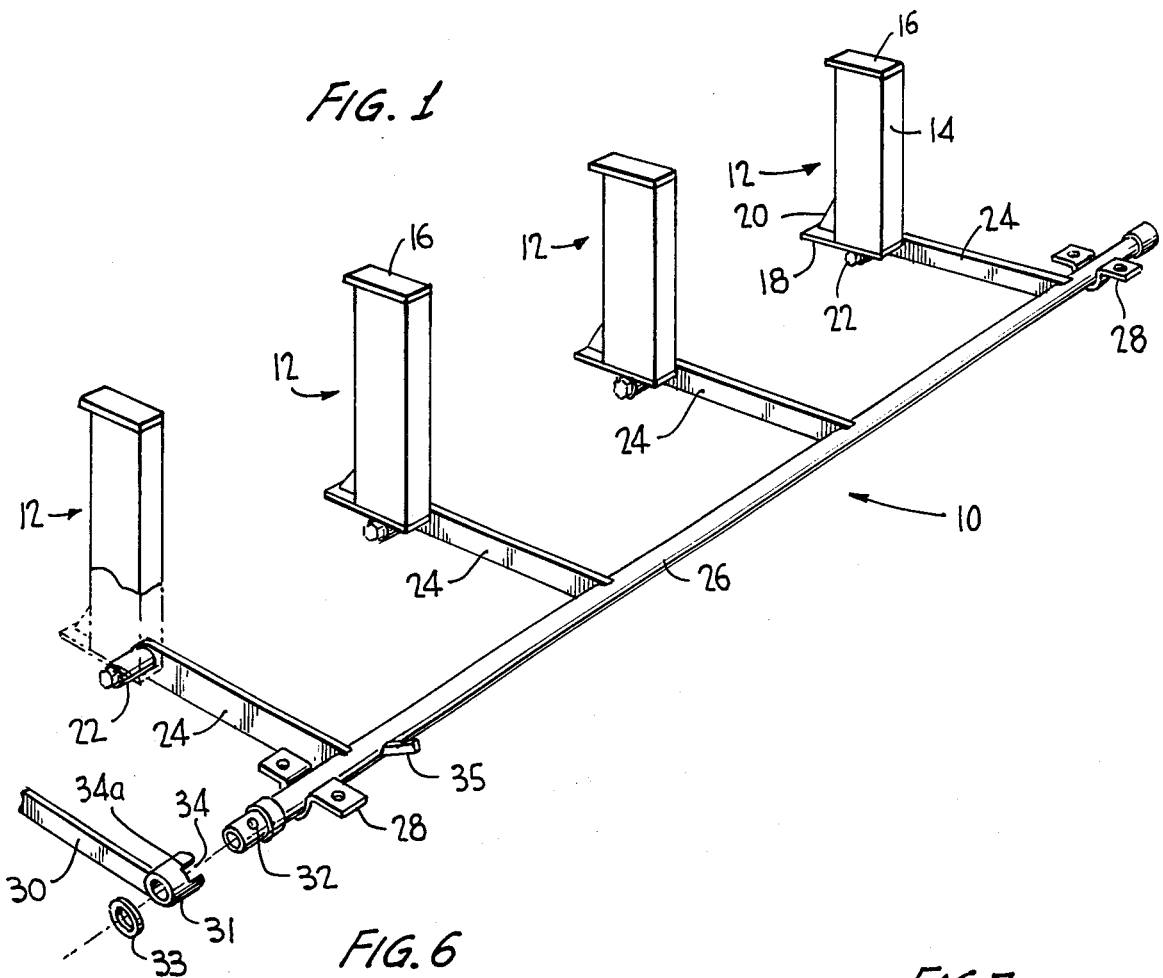
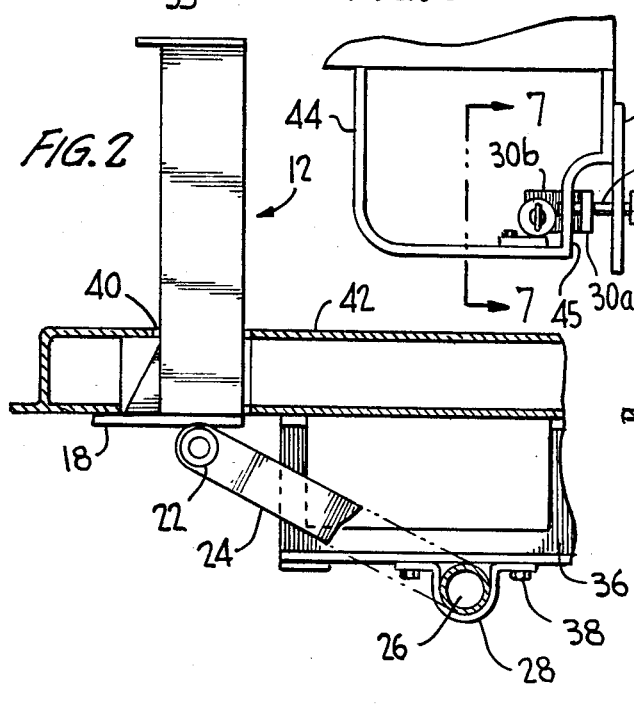
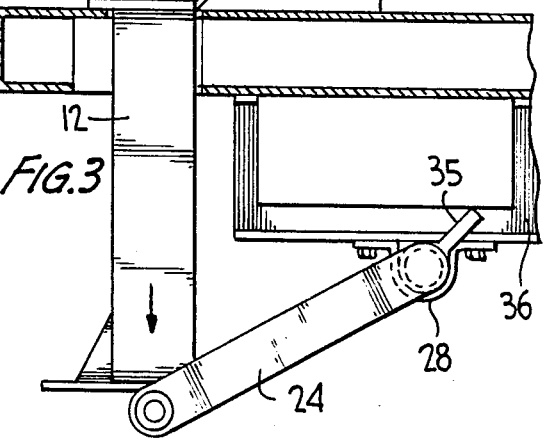

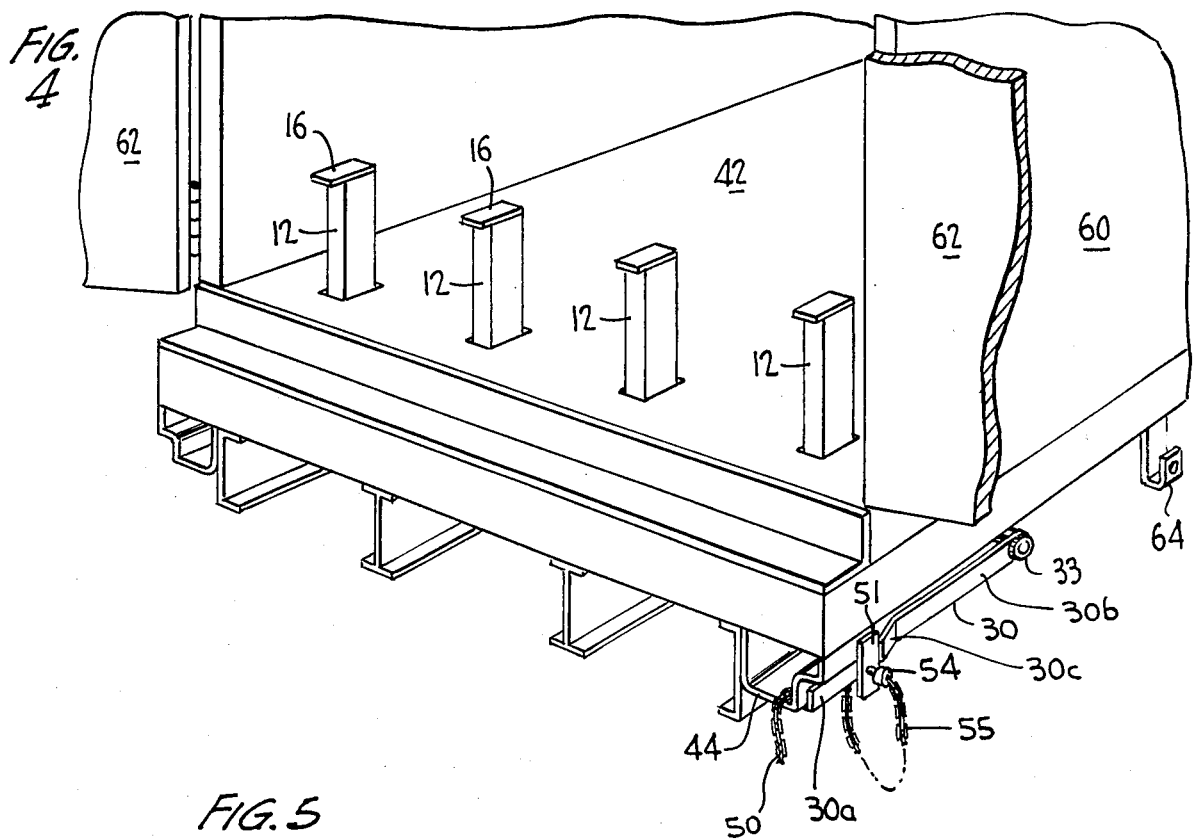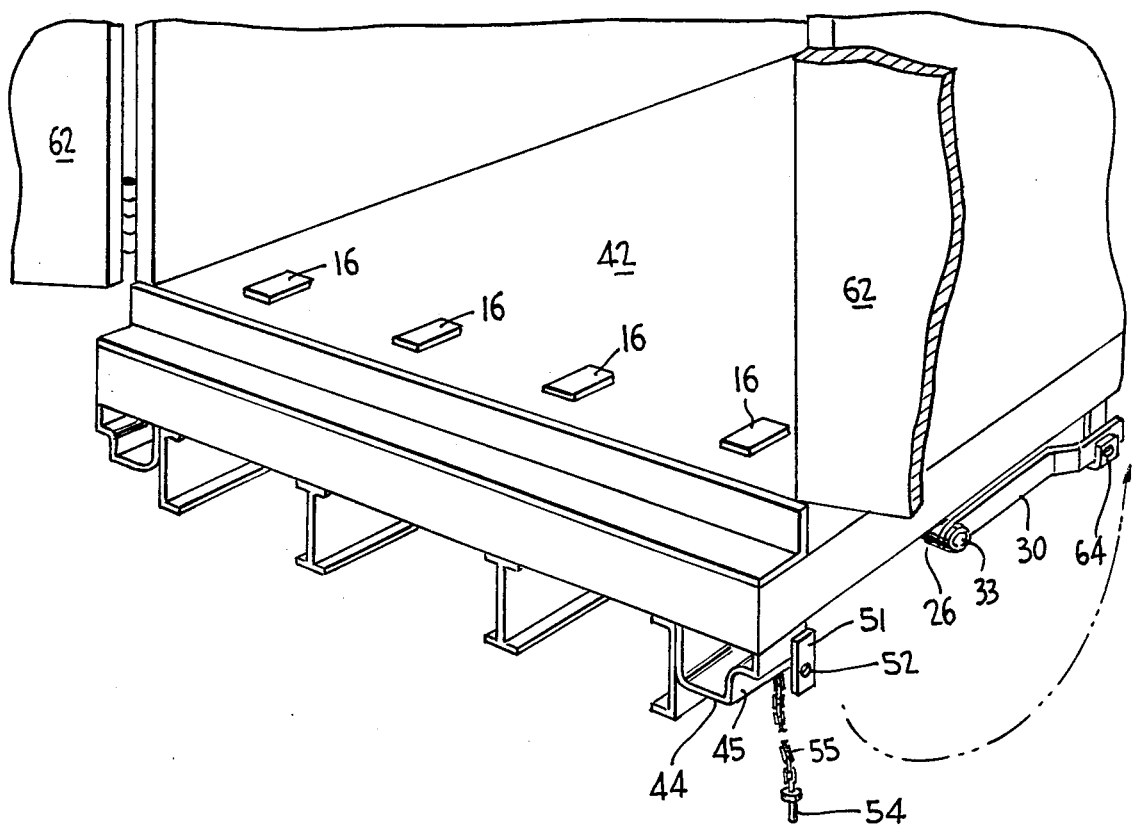

CARGO RESTRAINING DEVICE FOR A VEHICLE

BACKGROUND OF THE INVENTION

The present invention relates to cargo-carrying vehicles and, more particularly, to devices adapted to be installed in such vehicles so as to restrain shifting cargo.

Enclosed cargo-carrying vehicles such as semi-tractor trailers, containers, trucks, vans, railway freight cars and the like are prone to damage due to shifting cargo loads during acceleration and deceleration of the vehicle. For example, trailers carried "piggy-back" by railway flatcars are subjected to various severe bumps and jolts both during train movement and car switching, either of which can lead to cargo shifting within the trailer which then impacts with the trailer enclosure. While most trailer walls are designed to withstand such impacts without appreciable damage, the vehicle doors tend to be vulnerable since they are generally of lighter construction and are secured to the trailer body at discrete points such as the hinges and the latch and thus have significantly less strength than the remainder of the trailer. Under severe cargo shifting, the doors may even be forced open and cargo possibly lost from the trailer.

In order to protect the doors and other vulnerable portions of a vehicle from shifting cargo, it has been a practice to provide a series of openings in the vehicle floor adjacent the vulnerable portion and to insert sturdy wooden posts in the openings such that they project upwardly from the floor so as to provide a barrier for shifting cargo. While this practice is generally satisfactory for the intended purpose, the posts tend to be misplaced during loading and unloading of the vehicle and require storage space when not in use. In addition, it is impossible to ascertain whether the posts are in position when the vehicle is closed. Thus inspection to determine whether the cargo restraining posts are properly installed involves opening the doors of the vehicle.

SUMMARY OF THE INVENTION

It is therefore a feature of the present invention to provide a cargo restraining device which is an integral part of a cargo carrying vehicle.

It is another feature of the present invention to provide a cargo restraining device for a vehicle which can be placed in its operative position from the exterior of the vehicle.

It is a further feature of the present invention to provide a cargo restraining device for a cargo carrying vehicle which provides a visible indication from the exterior of the vehicle whether the device is in its operative position.

Briefly, in its broader aspects, the present invention comprehends a vehicle adapted to carry cargo, the vehicle comprising a cargo supporting surface having at least one opening and a cargo restraining device comprising a standard at least partially within the opening and capable of projecting from the opening above the cargo carrying surface, a rotatable actuation shaft extending beneath the cargo supporting surface, and a control arm extending from the shaft and having a camming surface engaging the standard whereby, upon rotation of the actuation rod, the standard is displaced vertically within the opening.

Further objects, advantages and features of the present invention will become more fully apparent from a detailed consideration of the arrangement and construction of the constitutent parts as set forth in the following description taken together with the accompanying drawing.

BRIEF DESCRIPTION OF THE DRAWING

In the drawing,

FIG. 1 is a perspective view of the basic components of the device for restraining cargo according to the present invention, FIG. 2 is a side view, partially in section, of the device of the invention in its operative cargo restraining position in the bed of a vehicle, FIG. 3 is a view similar to that of FIG. 2 which shows the device in its inoperative position in the bed of a vehicle, FIG. 4 is a perspective view of the door portion of semi-tractor trailer with the device of the present invention installed therein, the device being in its operative position with an actuation handle for the device shown in its locked position, FIG. 5 is a perspective view similar to that of Figure 4 with the device of the invention being shown in its inoperative position, with the actuation handle shown in a stored position, FIG. 6 is an end view of the actuation handle shown locked to a bracket extending below the vehicle bed; and FIG. 7 is a side view of the handle locking mechanism taken substantially along the line 7—7 of FIG. 6.

DETAILED DESCRIPTION OF THE PREFERRED EMBODIMENTS

Referring first to FIG. 1, device 10 for restraining cargo within a vehicle comprises, in this embodiment, four cargo restraining standards 12, each standard including elongated rectangular post 14, upper cap 16 and striker plate 18, both the cap and the striker plate being of larger dimensions than the cross-sectional area of the post. The joint between each striker plate 18 and post 14 is reinforced by vertical wedge 20. Standards 12 are suitably constructed of metals such as steel and the like, post 14 preferably being a rectangular tube. In the embodiment shown, standards 12 are fabricated by welding caps 16 and striker plate 18 as well as wedge 20 to post 14. It is however within the scope of the present invention for standards 12 to be formed integrally.

Each standard 12 is supported by roller 22 extending transversely from the free end of control rod 24, the roller functioning as a camming surface for standard 12. A plurality of parallel control rods 24 are secured at their other ends to actuation shaft 26 adapted to be pivotally mounted to a suitable vehicle surface by brackets 28. Affixed to one end of actuation shaft 26 is actuation handle 30 which is used for manually rotating the actuation shaft about its central axis. In the embodiment illustrated, handle 30 has a sleeve 31 retained on an end of actuation shaft 26 by a washer 33 or the like welded on the free end of the shaft which extends through the washer (see FIGS. 4 and 5). The sleeve is capable of relative rotation on the shaft end between opposing edges of its slot 34. A slip lock dowel on the shaft, in the form of a projection 32 extends into slot 34 and bears against edge 34a of the slot during rotation of the handle in a clockwise direction (as viewed in the drawings) for thereby rotating shaft 26 into the operative position of the cargo restraining device of FIG. 4.

After the cargo restraining standards are lowered, as will be described in more detail hereinafter, the handle is rotated counterclockwise into its storage position of FIG. 5 as permitted by the width of slot 34. Actuation shaft 26 is further provided with shaft stop 35 extending generally from the opposite side of the shaft from control arms 24.

As is best shown in FIGS. 2 and 3, device 10 is particularly adapted to be secured to undercarriage 36 of a conventional vehicle by brackets 28 and bolts 38 such that actuation shaft 26 extends transverse to the longitudinal axis of the vehicle and standards 12 project through openings 40 in cargo supporting surface 42 of the vehicle. In FIG. 2, actuation shaft 26 has been rotated such that roller 22 of control rod 24 has contacted striker plates 18 and has elevated standards 12 in unison such that striker plate 18 abuts the underside of cargo supporting surface 42. Thus the standard is in its fully elevated position for restraining cargo. A snap lock arrangement is provided, as best seen in FIGS. 6 and 7, for locking handle 30 and thus standards 12 in their elevated position. As shown in FIG. 4, the handle has nonaligned portions 30a and 30b connected by an intermediate bend portion 30c. A generally U-shaped bracket 44 is affixed to the underside of undercarriage 36 and is formed with a depression at it outer side defined in part by a side wall 45. In the FIG. 4 operative position of the cargo restraining device, handle 30 is substantially parallel to the undercarriage with portion 30b lying substantially in the same vertical plane as wall 45 of bracket 44 (see also FIGS. 6,7). In this position, portion 30a of the handle lies outwardly of wall 45 as permitted by intermediate bend portion 30c. A latch stop 46 is affixed to the inner surface of portion 30b in alignment with toggle pin 47 of a spring biased latch device 48 affixed to the lower wall of bracket 44, as shown in FIGS. 6 and 7. Thus, when handle 30 is swung into its FIG. 4 position, it is snap-locked to bracket 44 as forward tapered end 49 of latch stop 46 inwardly depresses pin 47 allowing it to return to its FIG. 7 position beneath stop 46. A pull chain 50 connected to pin 47 is manually pulled by the operator for releasing the latch lowering standards 12 to the FIG. 5 inoperative position.

A handle guide in the form of a plate 51 is affixed to the outer side of bracket 44 and has an opening 52 (FIG. 5) aligned with an opening 53 (FIG. 7) provided in handle 30. A safety dowel pin 54, connected to bracket 44 by a chain 55, is manually extended through aligned openings 52,53 for further locking the handle in its FIG. 4 position.

In FIG. 3, the actuation shaft has been rotated such that control arm 24 has allowed standards 12 to drop by gravity through openings 40 sufficiently that caps 16 contact cargo supporting surface 42 and the tops of the standards are essentially flush with the cargo supporting surface. Such position of standards 12 thus allows cargo to be easily loaded and unloaded from cargo supporting surface 42. In this position, shaft stop 35 on actuation shaft 26 engages the undercarriage 36 of the vehicle to prevent control arms 24 from rotating to a vertical position where the arms might present a hazard in the operation of the vehicle.

The operation of device 10 is further illustrated in FIGS. 4 and 5 where standards 12 are shown in their cargo restraining position in FIG. 4 and in their inoperative position in FIG. 5. As is apparent, device 10 is preferably mounted on trailer body 60 such that standards 12 are adjacent rear doors 62 to protect the doors from damage caused by shifting cargo.

FIGS. 4 and 5 also illustrate the manner in which handle 30 may be secured in both the operative and inoperative positions of standards 12. The handle is snap latched and safety locked in its FIG. 4 position, as aforedescribed. After the standards are lowered, the handle is swung into its FIG. 5 storage position and supported by a holder 64 affixed to the trailer body. As is apparent from FIGS. 4 and 5, the position of handle 30 gives a visual indication from the exterior of the trailer whether standards 12 are in the inoperative or operative position. Such an indication eliminates the need to open doors 62 to visually inspect whether standards 12 are in the proper position.

In the embodiment of device 10 as illustrated and described, the device is operated by manual rotation of handle 30. It is however within the scope of the invention to provide for powered actuation of the device by suitable means driven by hydraulic fluid, pressurized air, electric motors and the like.

Thus, in summary the present invention relates to a cargo restraining device which provides a cargo carrying vehicle with protection from the adverse effects of shifting cargo. In addition, when installed near the door of a cargo carrying vehicle, the device helps prevent loss of cargo which may otherwise occur when cargo shifts and impacts the doors thereby causing them to open. Furthermore the device is relatively easy to operate, does not interfere with cargo loading and its position can be visually determined from the exterior of the vehicle.

While there has been shown and described what is considered to be a preferred embodiment of the present invention, it will be apparent to those skilled in the art that various changes and modifications may be made therein without departing from the invention as defined in the appended claims.

It is claimed:

1. A cargo carrying vehicle comprising, a cargo supporting surface having at least one opening and a cargo restraining device comprising a standard at least partially within the opening and capable of freely shifting between a cargo restraining position projecting from the opening above the cargo carrying surface and an inoperative position projecting from the opening beneath the cargo supporting surface, a rotatable actuation shaft extending beneath the cargo supporting surface, and a control arm extending from the shaft and having a camming surface engaging the standard in the inoperative position for shifting the standard to the cargo restraining position upon rotation of the actuation rod in one direction.

2. A vehicle in accordance with claim 1 wherein the camming surface is a roller engaging a lower surface of the standard.

3. A vehicle in accordance with claim 2 wherein the control arm extends perpendicular to the axis of the actuation shaft and the rotational axis of the roller extends parallel to the axis of the actuation shaft.

4. A vehicle in accordance with claim 1 wherein the standard is elongated and has a stop to limit shifting movement of the standard to said cargo restraining position.

5. A vehicle in accordance with claim 4 wherein the stop on the standard is a striker plate which limits upward vertical movement of the standard from said inoperative position to said cargo restraining position.

6. A vehicle in accordance with claim 5 wherein the device includes locking means for maintaining the standard in said cargo restraining position.

7. A vehicle in accordance with claim 6 wherein the standard includes a stop in the form of an end cap to limit downward vertical movement of the standard when shifting from said cargo restraining position to said inoperative position.

8. A vehicle in accordance with claim 1 wherein the device includes locking means for maintaining the standard in said cargo restraining position.

9. A vehicle in accordance with claim 8 wherein the locking means includes a spring loaded pin adapted to engage the handle.

10. A vehicle in accordance with claim 1, wherein means are provided on said shaft for the rotation thereof of in said one direction and for the rotation of said shift in an opposite direction to permit said standard to shift by gravity to said inoperative position.

11. A vehicle in accordance with claim 10 wherein the actuation shaft includes a shaft stop to limit rotation of the shaft in said opposite direction.

12. A vehicle in accordance with claim 10 wherein the actuation shaft is connected to a handle for use in causing the shaft to rotate.

13. A vehicle in accordance with claim 12 wherein the actuation shaft is connected to the handle by a slip lock dowel to permit continued rotation of the handle in said opposite direction after the standard shifts to said inoperative position.

14. A vehicle in accordance with claim 13, wherein the device includes holder means for holding the handle in a storage position upon the continued rotation thereof.

* * * * *